(12) United States Patent
Zarnowski et al.

(10) Patent No.: US 6,590,198 B1
(45) Date of Patent: Jul. 8, 2003

(54) VIDEO BUS FOR HIGH SPEED MULTI-RESOLUTION IMAGERS

(75) Inventors: Jeffrey Zarnowski, McGraw, NY (US); Matthew Pace, Cortland, NY (US); Thomas Vogelsong, Jamesville, NY (US); Michael Joyner, North Syracuse, NY (US)

(73) Assignee: Photon Vision Systems, Inc., Cortland, NY (US)

( * ) Notice: Subject to any disclaimer, the term of this patent is extended or adjusted under 35 U.S.C. 154(b) by 0 days.

(21) Appl. No.: 09/490,374

(22) Filed: Jan. 24, 2000

Related U.S. Application Data

(63) Continuation-in-part of application No. 09/039,835, filed on Mar. 16, 1998, now Pat. No. 6,084,229.

(51) Int. Cl.⁷ .............................. H01J 40/14
(52) U.S. Cl. .................. 250/214 LS; 250/208.1
(58) Field of Search .................. 250/227.21, 208.1, 250/208.2, 214 R, 214.1, 214 LS; 348/301–311, 281–283

(56) References Cited

U.S. PATENT DOCUMENTS

| | | | | |
|---|---|---|---|---|
| 4,590,609 A | | 5/1986 | Chevalet et al. | 382/50 |
| 4,827,336 A | * | 5/1989 | Acampora et al. | 358/135 |
| 5,568,203 A | * | 10/1996 | Lee | 348/699 |
| 5,635,705 A | | 6/1997 | Saunders | 250/214 RC |
| 6,172,352 B1 | * | 1/2001 | Liu | 250/208.1 |

* cited by examiner

*Primary Examiner*—Que T. Le
(74) *Attorney, Agent, or Firm*—Nixon Peabody LLP

(57) ABSTRACT

An analog video bus architecture that utilizes the column parallel nature of CMOS imagers and more specifically Active Column Sensors, that eliminates the need for multi-port imagers, by increasing the useable bandwidth of single port imagers. An adaptation of this invention allows for either binning or interpolation of pixel information for increased or decreased resolution along the columns and more specifically for ACS imagers binning or interpolation along the rows. In this bus, the single video bus is replaced by multiple video buses and instead of selecting only one column for reading multiple columns are also pre-selected in-order to pre-charge the video bus. The video buses are then de-multiplexed back on to one port at the desired element rate. This architecture utilizes the column oriented video bus of CMOS imagers. It divides the large video bus capacitance by the number of video buses used. In addition, it allows multiple pixel time constants to precharge the video bus. The best commercially available imager designs now claim 40 MHz per analog port and suffer from reduced signal to noise ratios. To overcome this fundamental bandwidth limitation, imager designs in the past have had to increase the number of video ports per imager to achieve high frame rates. Multiple ports per imager breaks the focal plane into segments that are typically reassembled via post processing in a host computer. The other problem with multiple ports is each segment of the imager will have its own offsets and resultant Fixed Pattern Noise (FPN). PVS-Bus™ eliminates the objectionable segmentation and simplifies high-speed system design. Also, by utilizing the column parallel nature of CMOS video buses a method and improved method of using the PVS-Bus of binning and interpolation is described which results in increased frame rate, and for decreased or increased resolution.

17 Claims, 9 Drawing Sheets

VIDEO BUS FOR HIGH SPEED MULTI-RESOLUTION IMAGERS

This application is a continuation-in-part application of application Ser. No. 09/039,835 filed on Mar. 16, 1998, now U.S. Pat. No. 6,084,229.

FIELD OF THE INVENTION

This invention relates generally to busses and, more particularly, to a video bus for high speed multi-resolution imagers.

BACKGROUND OF THE INVENTION

An active pixel is a semiconductor device capable of converting an optical image into an electronic signal. Active pixels can be arranged in a matrix and utilized to generate video signals for video cameras, still photography, or anywhere incident radiation needs to be quantified. When incident radiation interacts with a photosite, charge carriers are liberated and can be collected for sensing. The number of carriers collected in a photosite represents the amount of incident light impinging on the site in a given time-period.

There are two basic devices with many variants, employed to collect and sense, charge carriers in a photosite. The two basic devices are photodiodes and photogates. Variants of photodiodes include, but are not limited to: Pinned, P-I-N, Metal-Semiconductor, Heterojunction, and Avalanche. Photogate structures include: Charge Couple Devices (CCD), Charge Injection Devices (CID) and their variants that include virtual phase, buried channel and other variations that utilize selective dopants. The selective dopants are used to control charge collection and transfer underneath and between the photogate(s) and the sense node.

The solid state imagers heretofore used have been dominated by CCD's because of their low noise as compared to Photodiodes and CIDs. The low noise advantage of CCD imagers is the result of collecting the photon generated charge at the pixel site and then coupling or shifting the actual charge to an amplifier at the periphery of the array. This eliminates the need for the long polysilicon and metal busses that degrade the signal with their associated resistance and capacitance. However, the low noise of the CCD requires the imager to be read in a fixed format and once the charge is read it is destroyed. The requirement of coupling the collected photon charge from the pixel to the periphery amplifier (a.k.a. CTE), requires proprietary processing steps not compatible with industry standards CMOS or BiCMOS processes.

Solid state imaging devices have developed in parallel with CMOS technology and as a result all imager manufacturers developed their own proprietary processes to maximize imager performance characteristics and wafer yield. Specialized silicon wafer processing kept imager prices relatively high. Linear active pixel sensors have been commercially produced since 1985. Beginning in the early 90's the move to transfer the proprietary processes to an industry standard CMOS processes was on. The advantages of using an industry standard process include: competitive wafer processing pricing, and the ability to provide on chip timing, control and processing electronics. By the end of the year 1992 a 512×512 CMOS compatible, CID imager with a preamplifier and CDS per column had been fabricated. The imager could either be operated as a random access 512×512 CID, or all the columns could be summed together and operated as a linear active pixel sensor.

Area arrays utilizing active pixel sensors in which a photodiode or photogate is coupled to an output source follower amplifier which in turn drives a Correlated Double Sampling (CDS) circuit, where the two outputs of the CDS cell then drives two more source followers circuits that in turn are fed into a differential amplifier are shown in U.S. Pat. No. 5,471,515. This uses source follower circuits, that typically have gains less than unity that vary from one source follower to another. The source follower gain variation is due to variations of FET thresholds. The source follower gain variation results in a pixel to pixel gain mismatch. Also, the active pixel sensors suffer gain variations due to the CDS circuit per column, when the CDS employs a source follower pair to drive its output. The resulting CDS signal and its corresponding offset can have different gains that are not correctable by the differential amplifier. Also, the source follower configuration of active pixel doesn't allow for binning of pixels.

The voltage mode of operation of prior art does not allow for binning, which, is the summation to two or more pixel signals at once.

What is needed is an imager device which has the low noise level of a CCD, the random access, and binning of a CID, and uniform gain and response from all pixels.

Conventional Approaches to Industrial/Scientific Cameras

The CCD sensor and camera electronics technology has evolved over the last 30 years to meet most of these demands. However the resulting cameras require a state-of-the-art, large pixel, multi-port CCD chip plus several extra chips and usually several circuit boards filled with electronics to accomplish this. Thus, the cameras cannot physically fit in certain applications, the power consumed is significant, and last but not least, the resulting cameras are far too expensive for many applications. The necessary recombination of the video data from several ports, further increases the video processing complexity and ultimately drives-up the cost and size of the video system.

Over the past several years, thanks to design rule shrinkage, image sensors using sub-micron CMOS process technology have become practical. By using CMOS technology for the sensor array itself, the problem of integrating extra circuitry on chip becomes straightforward. Elements such as A/D converters, timing generators, control circuitry and interface circuitry can easily be added. In addition, the operation of CMOS imagers is simplified by the elimination of the need for precise timing and level control of multiple clock required to drive the large capacitance transfer gates inherent in CCD's. Even with all of these factors, including the exceptional speed and pico-second gate delays of sub-micron processes, the analog video bandwidth per port hasn't changed much over the past 20 years.

Active pixel sensors (APS) have been proposed as the means to achieve the flexible benefits of CMOS cameras on a chip. Unfortunately, there are performance issues with the fundamental APS approach that limit its performance and functionality. While these limitations may be acceptable for consumer imaging applications, the demands of scientific and industrial applications have, up until now, been largely unmet by CMOS image sensors.

BRIEF DESCRIPTION OF THE DRAWINGS

FIG. 10 is a photograph of the invention.

DETAILED DESCRIPTION OF THE INVENTION

Figure 1:
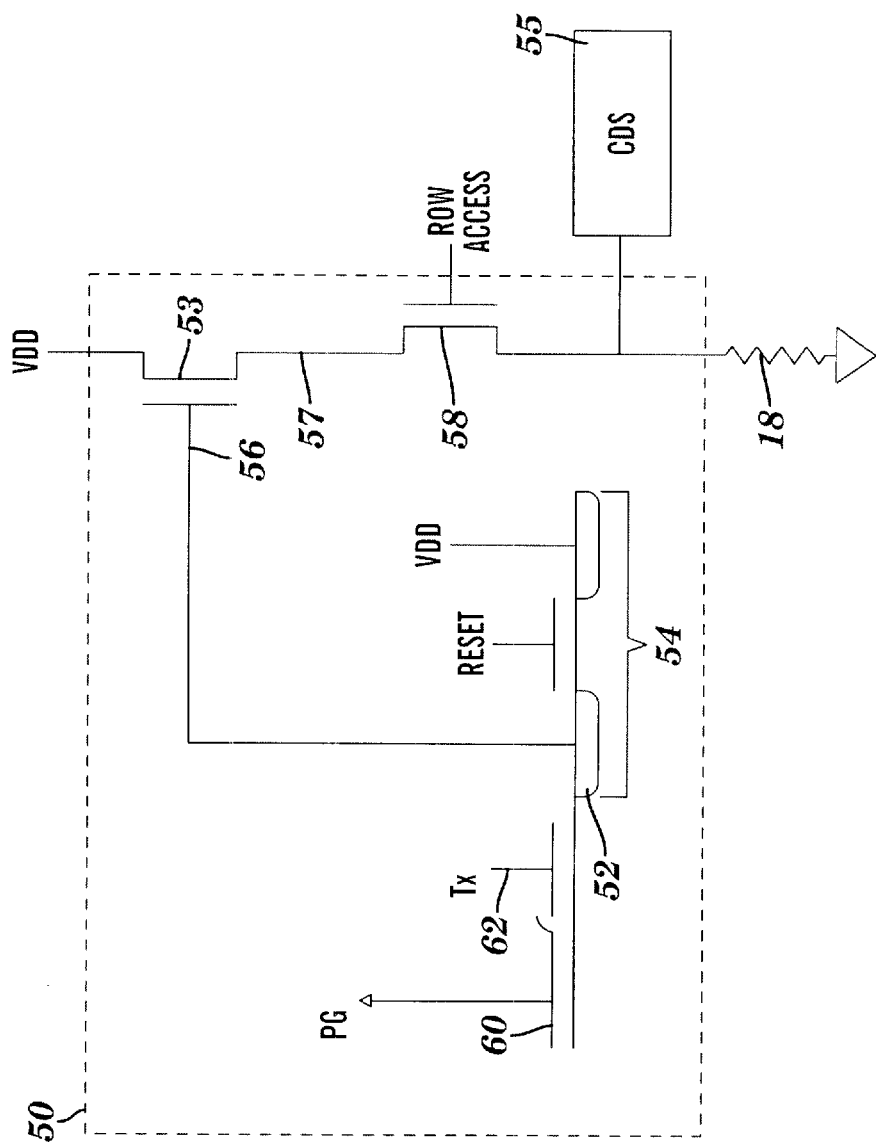
FIG. 1 is a prior art double polysilicon active pixel sensor.

Before discussing the Active Column Sensor (ACS) circuit of FIG. 2 of the present invention and described in conjunction with a discussion of ACS below, it will be useful to discuss the structure of a typical double-polysilicon active pixel sensor of prior art as shown in FIG. 1.

In FIG. 1 each pixel 50 has a photosite 60 that has an output FET 53 configured as a source follower. The source follower 53 is used to drive a subsequent signal conditioning circuitry, such as a Correlated Double Sampled Circuit (CDS) 55. The gain through a source follower 53 is less than unity. If the source follower located at the pixel site 50 has a given gain other pixels and their respective source followers in the same column may or may not have the same gain. The technique relies on wafer processing for all FETs in the array to have the same threshold. It isn't uncommon for FET thresholds, during operation, to vary by 100 mV for a linear active pixel array.

The active pixel 50 of the prior art includes a photogate 60 and a transfer gate 62 that are used to couple photo generated charge onto the floating diffusion node 52 which is connected to the gate 56 of source follower 53. The drain of the output FET 53 is connected directly to a power supply rail VDD. The source follower output FET is in turn connected to the source 57 of row access FET 58. When the row access FET 58 is selected for reading, the FET 58 is turned on, allowing output FET 53 to be connected to a load 18 and drive the CDS circuitry 55 directly.

Figure 2:
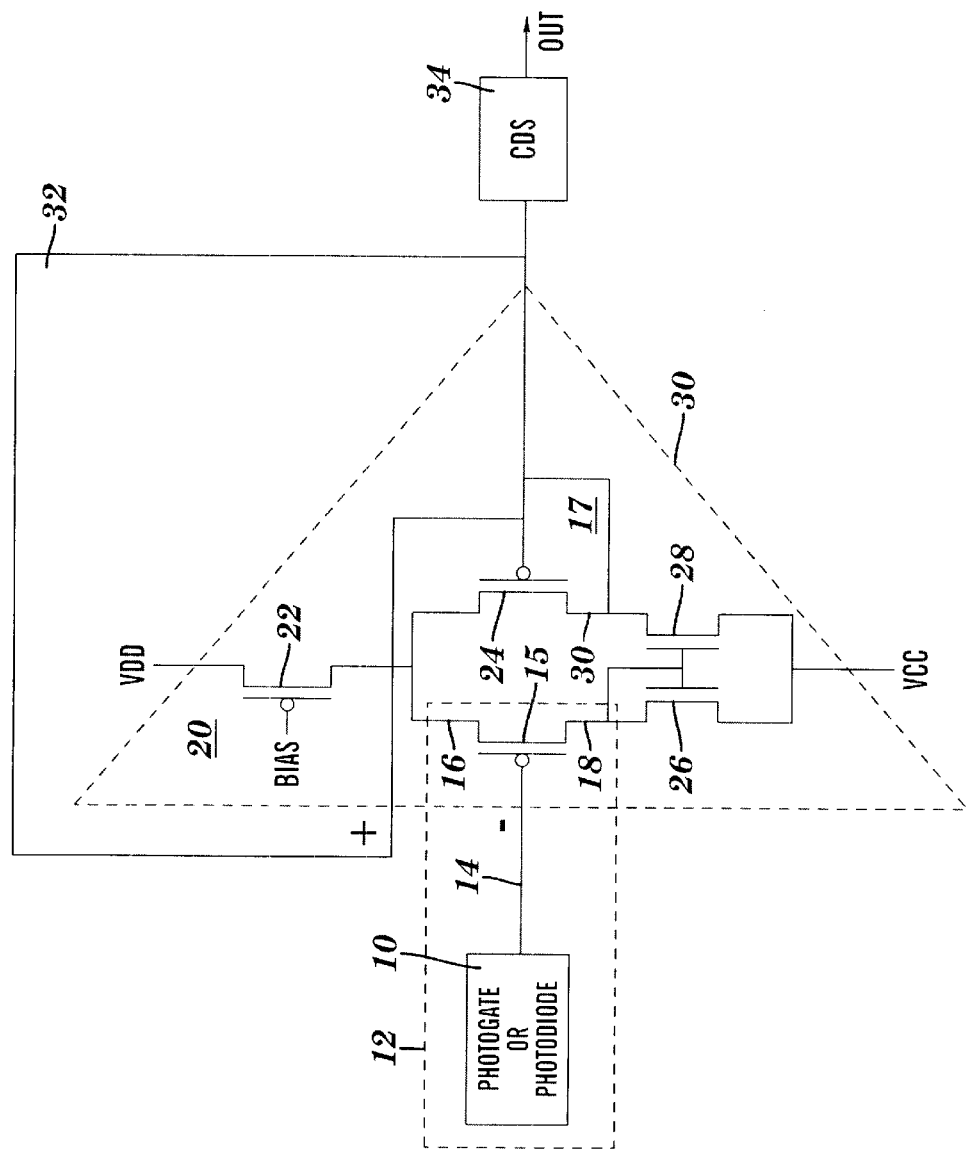
FIG. 2 is an active column sensor in accordance with this invention.

FIG. 2 is a schematic diagram of a pixel 12 in accordance with the present invention in which the threshold variations from pixel to pixel of the prior art are eliminated. All pixels 12 in a row or column are in parallel and for simplicity only one is shown. Pixel 12 which can consist of any photosensitive device 10 is coupled to an FET 15 to isolate the pixel from the readout circuitry. The FET 15 is one FET of a differential input pair of an operational amplifier 30 that includes FET 24. For simplicity, in FIG. 2 the amplifier circuit 30 is configured as a positive feedback unity gain amplifier. A feedback path 32 connects the output of amplifier 30 to input 17 which in this case is the gate of FET 24. The amplifier 30 could be configured to have gain, a full differential input or any operational amplifier configuration as the application required. The fixed gain of amplifier 30 eliminates the gain variability of the prior art. The output of the unity gain amplifier is connected to a Correlated Double Sampler (CDS) which is utilized to eliminate any fixed pattern noise in the video.

A current source 20 comprising an FET 22 has its source connected to a power source VDD and its drain connected to the sources of differential input FETs 15 and 24.

The drains of input FETs 15 and 24 are connected to a current mirror formed from FETs 26 and 28. The gates of FETs 26 and 28 are connected together and to the source 18 of input FET 15. The sources of FETs 26 and 28 are connected to a negative power source, VCC.

The drain 30 of FET 24 is the output of the differential pair and is connected to CDS 34.

The input FET 15 could be either a N channel or P channel FET as the application requires. The pixel 80 could be either a photogate or photodiode.

Figure 3:
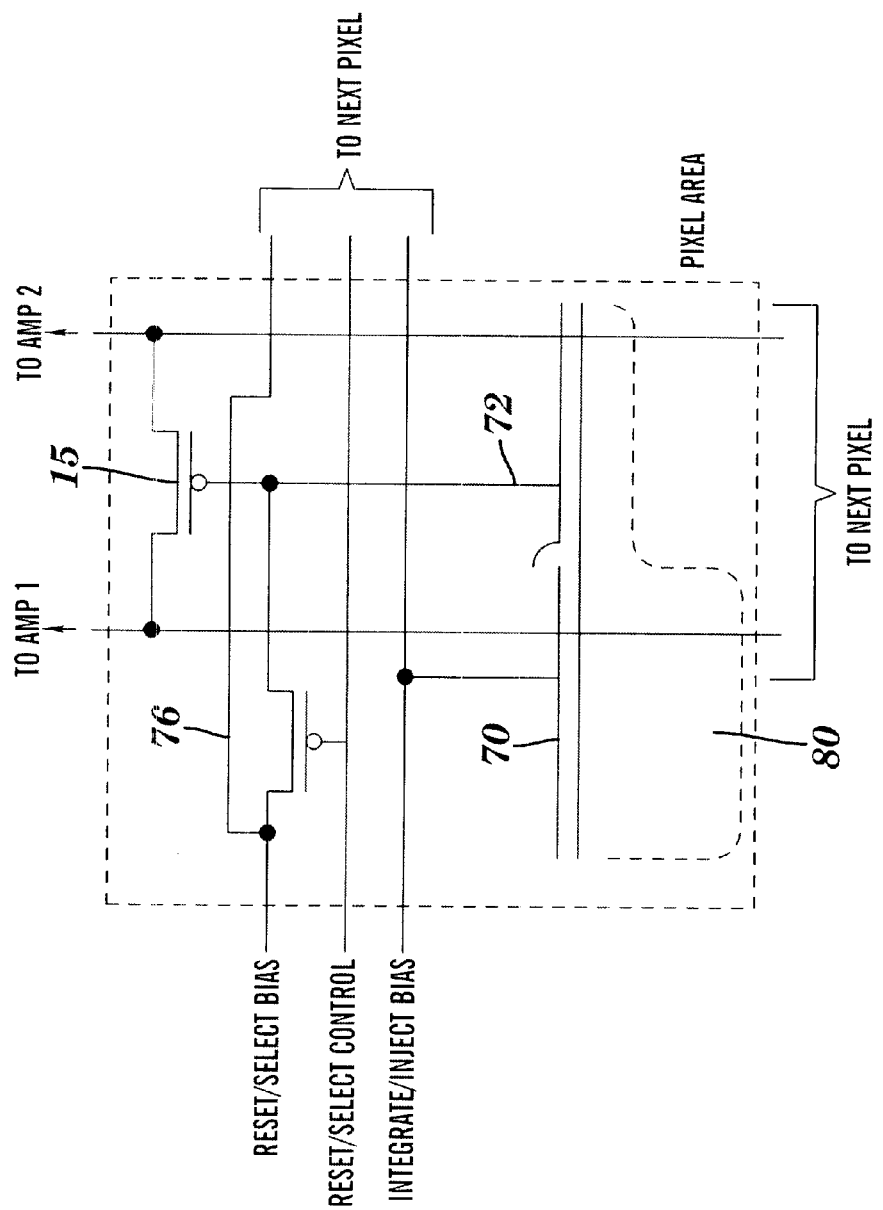
FIG. 3 is an implementation of a pixel in accordance with the invention.

FIG. 3 is a detailed schematic of pixel 12 of the active column sensor shown in FIG. 2. In this implementation a photogate 76 is utilized. Selection and reset of a sense node 72 is controlled by an FET 76. This Active Column Sensor pixel eliminates the separate selection/access FET 58 of prior art. All biasing and controls signals are supplied from the periphery of the pixel array.

The pixel can be operated in the following manner. An N type substrate is used and the substrate is biased the most positive potential, e.g. 5.0 volts. The photogate 70 preferably a layer of polysilicon is biased to an integrate level (e.g. 0.0 volts). The region 80 under the photogate 70 is depleted and as light strikes the immediate area, it will collect (integrate) photon generated carriers. Photogate 72 is been biased to the 5.0 volts and will not collect photon generated carriers during the integration because it is biased to the same potential as the substrate. Photogate 72 is biased by selecting control FET 76 with the reset/Select Control signal. In this configuration control FET 76 is a P channel FET that is selected by a negative signal relative to the substrate, for example 0.0 volts. During integration FET 76 is selected, the photogate is biased by the reset/select bias that preferably is at 5.0 volts. After a predetermined integration time period the pixel is read.

Reading the pixel is preferably accomplished in the following manner. The reset/select control is changed to 2.5 volts, causing the region beneath photogate 72 to be depleted, and the background level is read. Reset/select FET 76 is turned off by setting the reset/select control to 5.0 volts. Photogate 70 has its potential removed, and in this example 5.00 volts. Reading the signal will occur as the collected photon generated charge transfers from the region beneath photogate 70 to the region beneath photogate 72. The transferred photon generated charge modulates the gate of input FET 15, according to the amount of collected.

Fixed Pattern Noise (FPN) can be eliminated from the video information by utilizing CDS circuit 34. The first sample applied to the CDS circuit is the background level. The signal information is then applied to the CDS. The difference of the two signals provides for a fixed pattern noise free signal.

Figure 4:
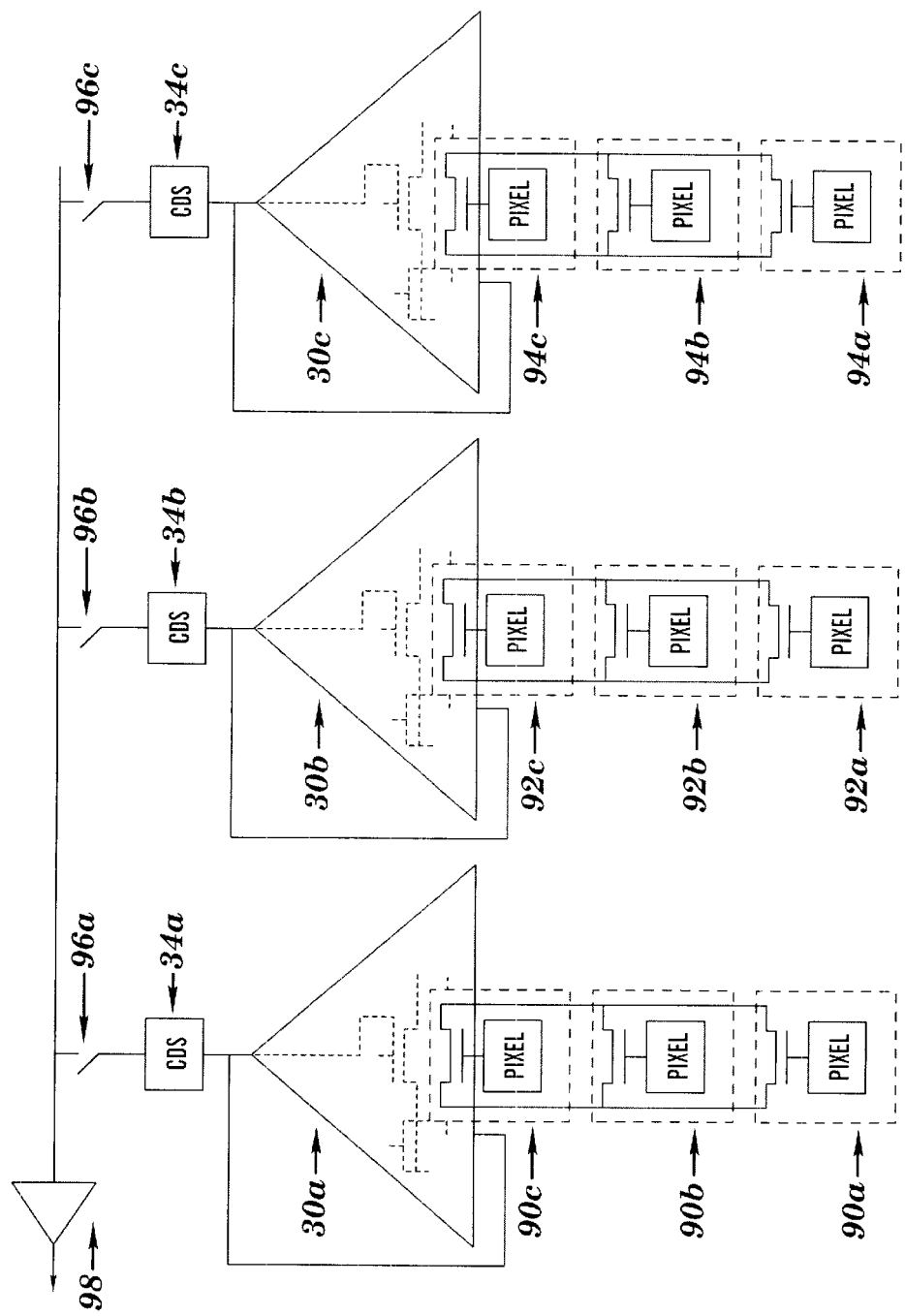
FIG. 4 is a schematic illustration of a matrix of pixels connected to incorporate a full operational amplifier per pixel forming an Active Column Sensor.

FIG. 4 is a schematic diagram of an array of pixels in accordance with this invention. A plurality of pixels 90a, 90b, 90c form a first column of the array, and similar columns 92a–c and 94a–c complete the array. Within each column, the pixels are connected with their output FETs in parallel, the combination forming the first one of the differential input pair of operational amplifier 30. In all other respects, amplifiers 30a, 30b and 30c are identical to FIG. 2. Each amplifier 30 is connected to a CDS 34a, 34b, and 34c respectively. The outputs of CDS 34a, b, c are connected through column select switches 96a, 96b, and 96c, the common terminals of which are connected to output buffer 98 which can be a source follower, or a more complex signal conditioner as required by the specific application.

Industrial and scientific imaging applications require much higher performance and functionality than that required for consumer imaging products. Typical applications of this class of cameras include machine vision for automated inspection. Many of the applications require high readout speeds for video rate or even faster imaging without sacrificing image quality. In addition to image quality, the applications have come to demand greater functionality in the camera. Features such as flexible shuttering and electronic zoom, random access and selectable region of interest for maximizing frame rates and minimizing data storage (especially useful in tracking applications). Lowering the cost of machine system development is the recent advancement of single chip CMOS cameras. Newly developed CMOS cameras have all the flexibility previously listed; however, the analog video bandwidth per port hasn't changed from the traditional CCD, CID or Photodiode technologies. This invention relates to high speed video bus requirements in general and more specifically to solid state imagers.

The following section describes one embodiment of an on-board, high-speed bus that allows pixel rates exceeding those of single port CCD or APS devices in accordance with the present invention. This bus in combination with the highly parallel nature of amplifier per column techniques of CMOS sensors that provides both the functionality and high speed performance required for scientific and industrial applications. Experimental results of one embodiment of the present invention are also presented.

1. Conventional Video Bus Issues

Figure 5:
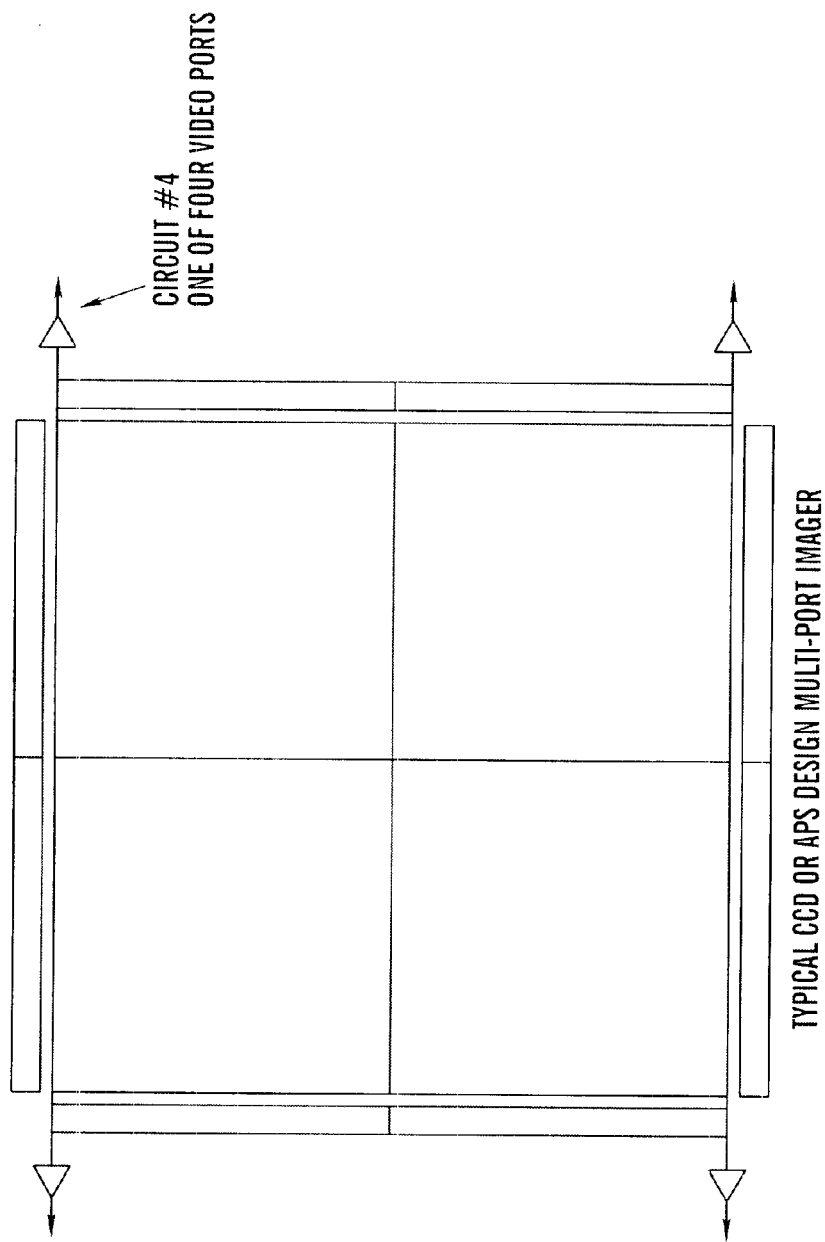
FIG. 5 is a view of a traditional CCD and CMOS sensor method of increasing video bandwidth with multiple ports.

Most mega-pixel image sensors, including both CCD imagers and APS imagers, have a maximum pixel rate inadequate to meet the frame rate needs of industrial and scientific imaging. CCD devices are limited by both clocking rates and the speeds of the Correlated Double Sampled (CDS) circuitry. In addition the higher amplifier bandwidth required for higher pixel rates increases noise levels. With the column parallel nature of CMOS imagers, the amplifier and CDS can be run at the line rate rather than the pixel rate. The video bandwidth constraints come in terms of the multiplexing speed. CMOS imagers typically multiplex their signals onto a common analog video bus. The more signals that are multiplexed or switched onto the bus, the greater the capacitive load of that bus. Therefore, as more signals are connected to the bus, the bandwidth of the bus is reduced. Alternatively, greater power is needed to charge and discharge the bus with its associated capacitance to maintain bandwidth. In order to overcome the constraints, designers of CCD's and APS sensors have resorted to dividing up the imager into halves, quarters, or smaller groupings of sub-imagers, jammed together. The signal from each of these sub-imagers is brought out to its own port, as shown in FIG. 5. Circuit 2 of FIG. 5 is a video port that is replicated four times in this example. This approach has been used to provide high frame rate devices, or even to meet standard frame rates with large mega-pixel imagers. This adds system size, complexity, power and cost to handle the multiple analog amplifier chains. In addition, it is an extremely challenging task to balance the amplifier chains completely over all possible pixel rates and temperatures. This issue has become even more of a problem in recent years as imagers have grown larger, now up to full wafer size. The process variations across an array can lead to further balance problems, and even variations in noise characteristics, due to process variations across a wafer.

Figure 6:
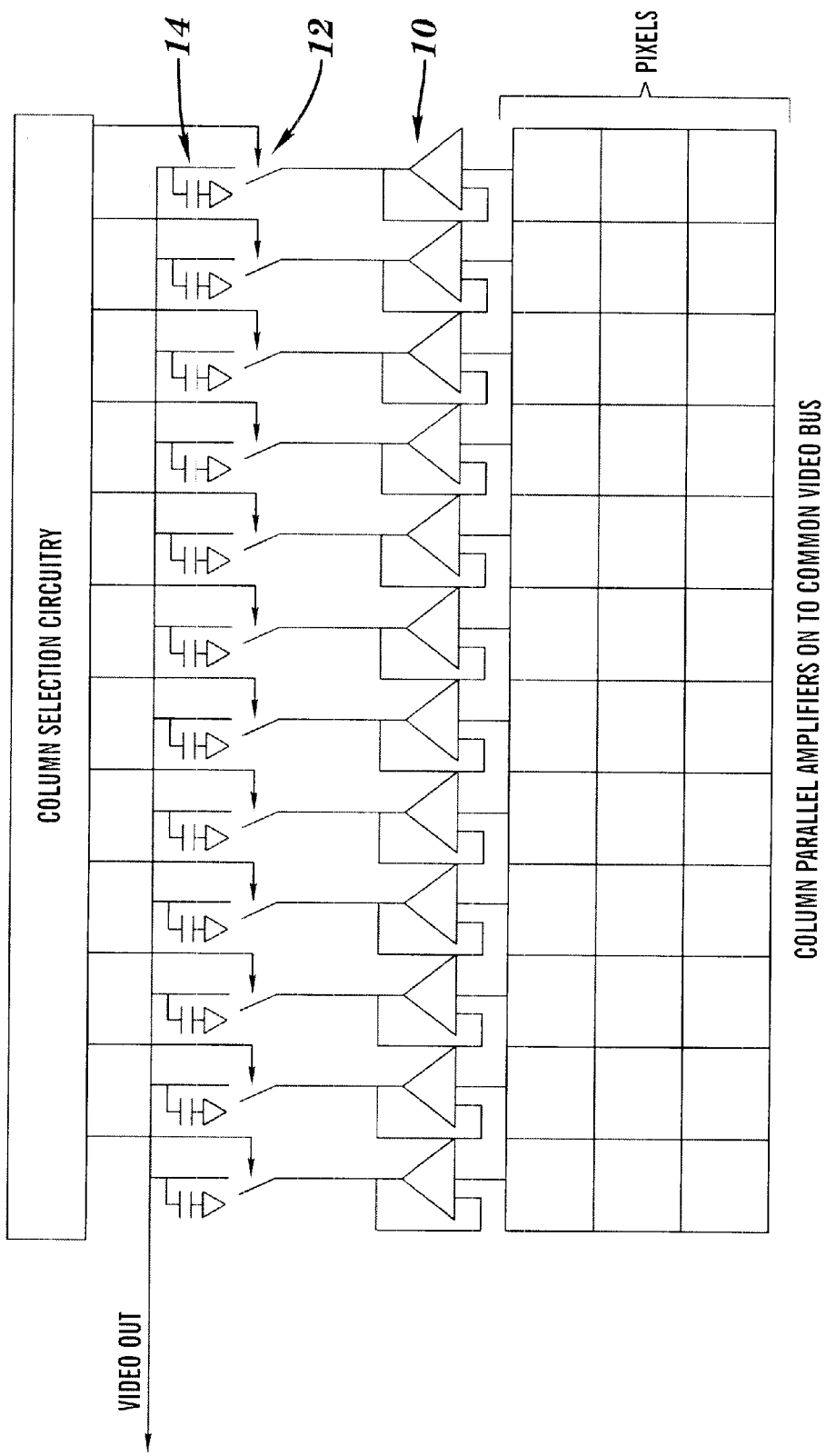
FIG. 6 is a view of a conventional method of driving a common video buss on an imager.

Often CMOS imagers have column parallel amplifiers that drive a common video bus. The common video bus is seen mostly as a capacitive load to each individual column amplifier as shown in FIG. 6, circuit 14. In order for each amplifier to truly represent the pixel value onto the common video bus, the amplifier must charge or discharge the bus with in one pixel time constant. It must be stable long enough for a sample and hold circuit (or similar) to accurately present the resultant signal to an A to D converter. A conservative engineer will want at least $5\tau$ (tau or time constants) to accurately allow the video bus to settle the video value presented by each individual column amplifier. At higher video bus speeds the individual column amplifier, FIG. 6, circuit 10, is unable to properly charge or discharge the video bus and results in a loss of contrast ratio. At higher pixel element rates where the contrast ratio is compromised, the individual column amplifier characteristic and the video switch characteristics begin to affect the resultant video. The individual column amplifiers will have slightly different offsets, FIG. 6, circuit 10, with slightly different drive capabilities and each video switch, FIG. 6, circuit 12, will have slightly different resistances and slightly different thresholds. This combination of column amplifier and video switch characteristics results in each column amplifier having different time constants relative to charging and discharging the video bus. The column amplifier and video switch are common to every pixel in that column. Thus, variations in the video switch characteristics result in what appears to be column based Fixed Pattern Noise (FPN). As more columns are added, each video switch adds more associated capacitance, FIG. 6, circuit 14, due to the source and drain junctions of MOSFET or Bipolar transistors. The more columns added to the bus, the higher the total capacitance. Having identified the source of column based FPN and knowing that the pixel element rates cannot exceed the ability of the weakest column amplifier on the video bus a solution should be identifiable, without requiring high power amplifiers per column.

2. High Speed PVS Bus

A preferred approach over the segmented four port imager of FIG. 5, would be to read out the imager four times faster on a single port. The ACS series of imagers incorporates a novel method of increasing the read rate of analog buses called the PVS bus. This speed increase has been achieved without increasing power consumption, and full video bandwidth is maintained even at the higher speeds. Common mode noise pickup is eliminated through the use of fully differential processing.

Figure 7:
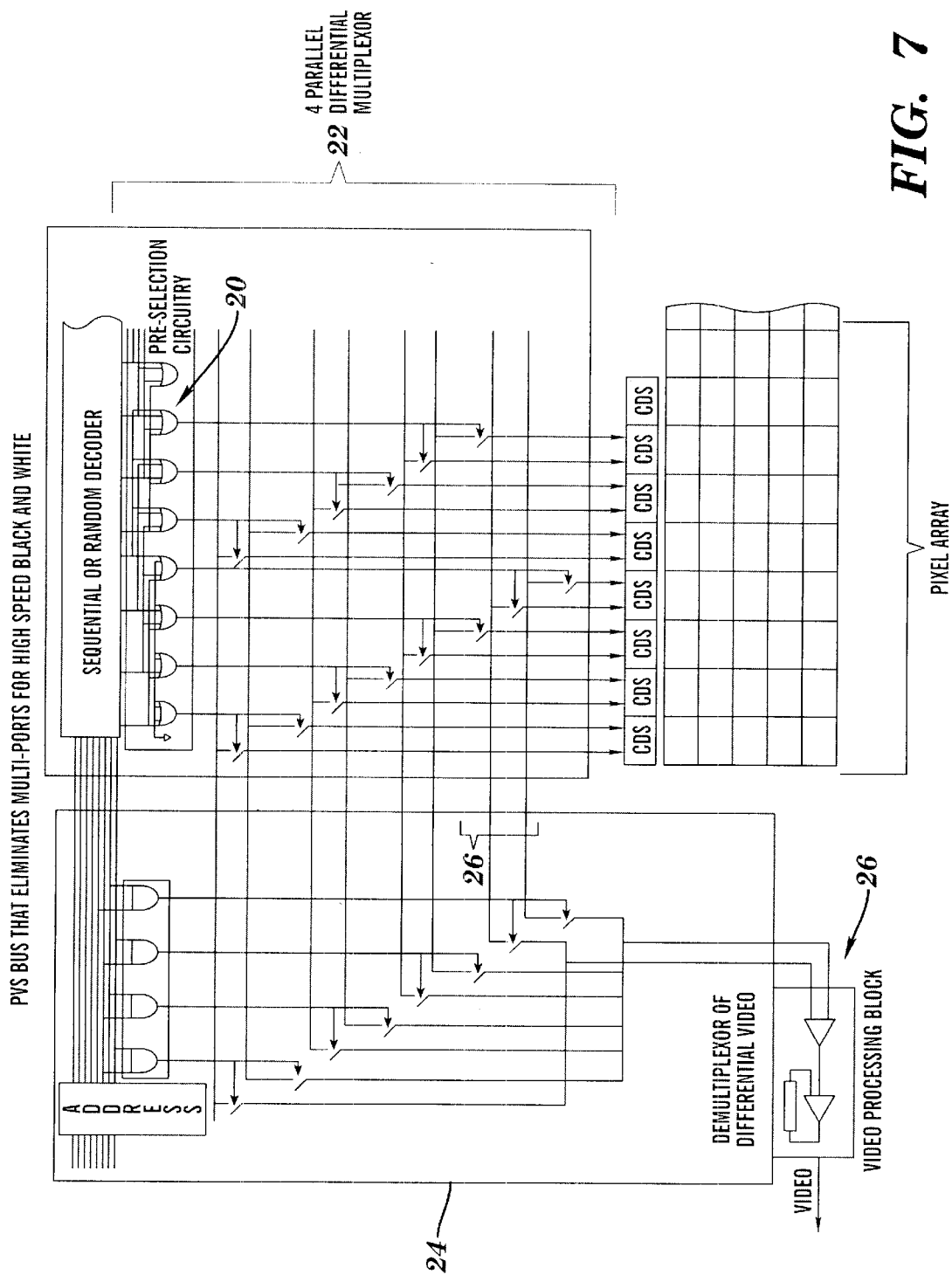
FIG. 7 is a view of a high speed low noise video bus.

The high speed, low noise, low power analog PVS bus for imagers as shown in FIG. 7 utilizes either standard sequential or random access decoders for selection of a particular column. In addition to selecting that column, it has the added preselection circuitry to pre-select the next three columns in the read sequence in parallel. The number of columns pre-selected can be scaled to meet the application requirements; four buses are used in FIG. 7 for illustration purposes only. Preselection, circuitry 20 of FIG. 7 is effectively a four input "or" Boolean logic function. Now instead of having separate quadrants of pixels as in FIG. 5, there is only now only one. Preselection circuitry works in conjunction with parallel multiplexors, where the four columns are selected in parallel and are multiplexed to a separate differential video bus, FIG. 7, circuit 26, for each column selected. Parallel multiplexors, Circuit 22, FIG. 7. as shown in FIG. 7, circuit 26 utilizes differential video per column and has two video buses for each column address. Therefore the total number of video buses is eight for FIG. 7.

The purpose of selecting the current column and pre-selecting the next three columns is to allow the video bus to charge up to the proper value and settle prior to being demultiplexed by circuit 24 as shown in FIG. 7. By pre-selecting the three columns (or pixel time constants) ahead of time, the column video processing circuitry only has to drive the video bus at one quarter the actual pixel read rate (one-fourth the bandwidth) and therefore can be made smaller and lower power than they would otherwise have to be. Also, since each column is connected to only one out of every four columns the video bus has only one-fourth of the capacitance, because there are only one fourth of the transmission gates (or switches) to drive. As a result, each column selected also pre-selects the next three columns in sequence. The column selection sequence remains conventional, without the need for post processing reconstruction of the original image required of multi-port imagers. The analog pre-charging is done at a one-fourth the bandwidth in FIG. 7 than the prior art conventional single ended video bus and only the demultiplexing is done at the normal bandwidth.

The demultiplexor of FIG. 7, 24 is a fully differential video bus designed to match the fully differential multiplexor of FIG. 7, circuit 26. Parallel multiplexors isolate all the different video buses. The timing for the demultiplexor circuit is generated via external control, an on chip counter, a small shift register, or a controller. The demultiplexor timing control logic which in the implementation shown, is a counter with count decode logic. The video processing block that takes the differential video, provides gain, offset, filtering, or any video processing function. The demultiplexor timing control logic may decode the video bus circuit in any sequence that the application requires.

Figure 8:
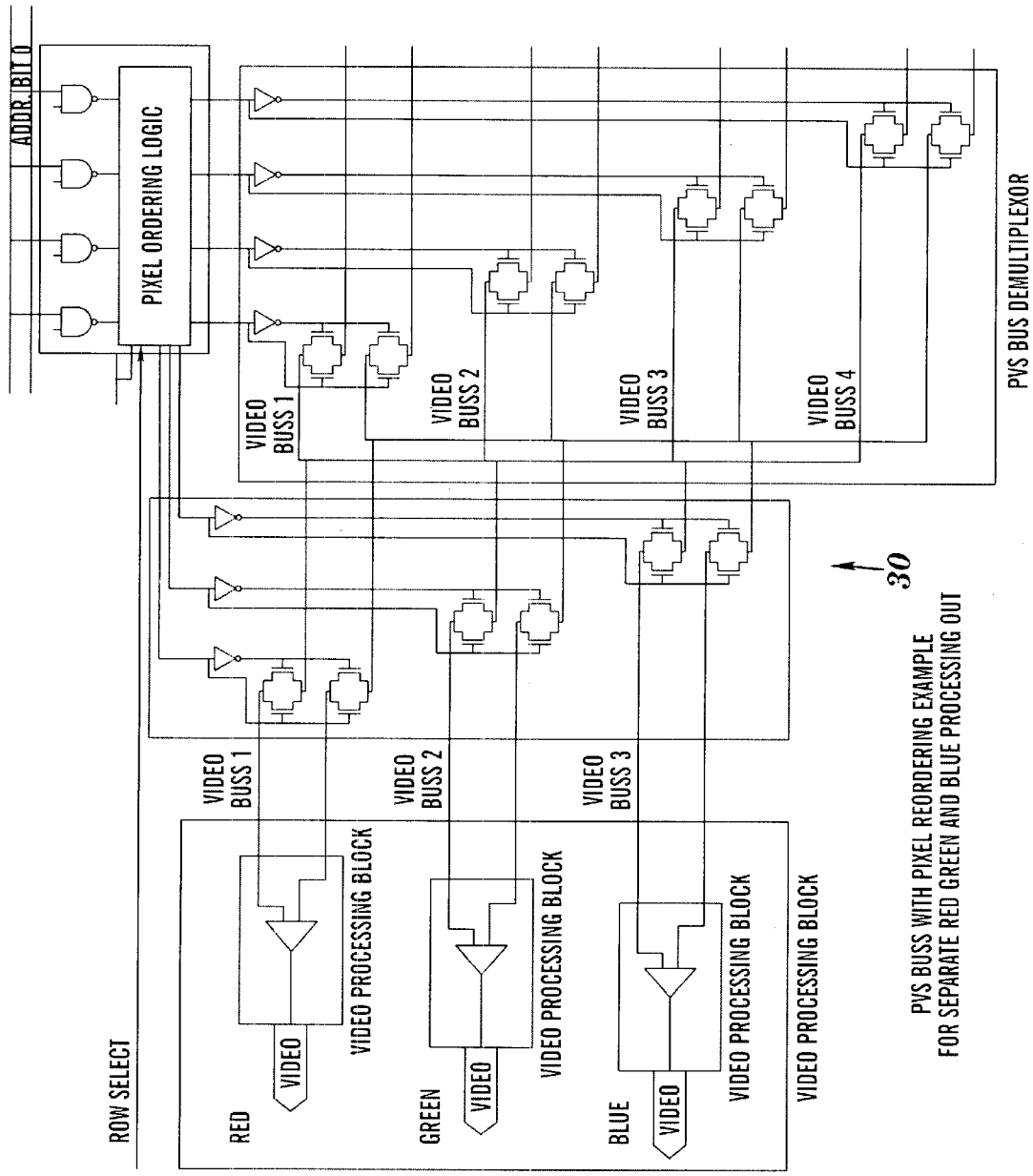
FIG. 8 is a view of a bus for pixel reordering with a video processing block and a bus demultiplexor.

By utilizing the highly parallel nature of CMOS imagers and more specifically the fully differential video provided by the Active Column Sensor(ACS patent approved) technology, the PVS Bus is able to maintain near ideal MTF with high video bandwidths. The parallel nature of the PVS Bus also allows pixel reordering as shown in FIG. 8, circuit 30. Pixel reordering can be column and/or row based. An example of row and column based reordering is the Bayer (or other) color filter. FIG. 8 illustrates how the PVS Bus demultiplexor can go to another demultiplexor to reorder pixels as columns are read. The manner that the pixels are reordered can be row dependent, as is the case for color filters.

3. Combining Columns

Another useful approach to the column parallel nature of CMOS imagers is the ability to select multiple columns at once to average the video signal. This is possible because the column amplifiers of FIG. 6, circuit 10 are identical in every detail and when more than one is selected at once the outputs from each amplifier try to drive each other and the result is that the two or more signals are averaged. This allows for higher speed of operation and it also gives a new method of binning or interpolating pixels. Binning is a term used to combine two or more pixel signals together. The higher speed of operation is due to two or more amplifiers driving the same video bus and as a result there is up to two times (or more) the ability to drive the same amount of capacitance. The binning is a result of combining two or more signals at the same time on the same video bus. The net result of combining multiple signals (a.k.a. averaging) onto the same bus is to effectively a multi-resolution imager.

This multi-resolution ability of the video bus can be used to effectively increase the resolution, through interpolation, not just decrease the resolution through binning. The increase of resolution is through the use of selectively binning adjacent signals in between reading individual signals. In this manner, the time sequence would be for a conventional column orientated CMOS video bus, as in FIG. 6, would be select column 1 and read the signal. Next in sequence leave column 1 selected and also select column 2. Read the combined (binned or averaged) signal and deselect column 1 and now only read column 2 signal. In this manner for every two adjacent signals read, a third interpolated signal can be read effectively increasing the resolution through interpolation. This allows a typical imager with 640 columns to have the effective resolution of 1279 pixels through interpolation.

4. Row Binning

The ACS series of imagers has been developed specifically for scientific and industrial applications and utilizes a bus in accordance with the present invention. The design incorporates the Active Column Sensor design approach that uses a unity gain amplifier per column with a selectable input transistor at every pixel along that column. An ACS technology imager will uniquely allow binning or interpolation along the row in a similar manner as the columns were just described above. The ability to bin (or average) is described in the ACS imager patent. Interpolation that the ACS technology uniquely allows, would utilize the just described method in the previous paragraph for the first row of video. The ACS imager would then select two adjacent rows of video (rows 1 and 2) and the above interpolation would be repeated and followed again by only selecting row 2 and rereading only row 2. In this manner a typical imager with 480 rows, can have an interpolated resolution of 959 rows.

Figure 9:
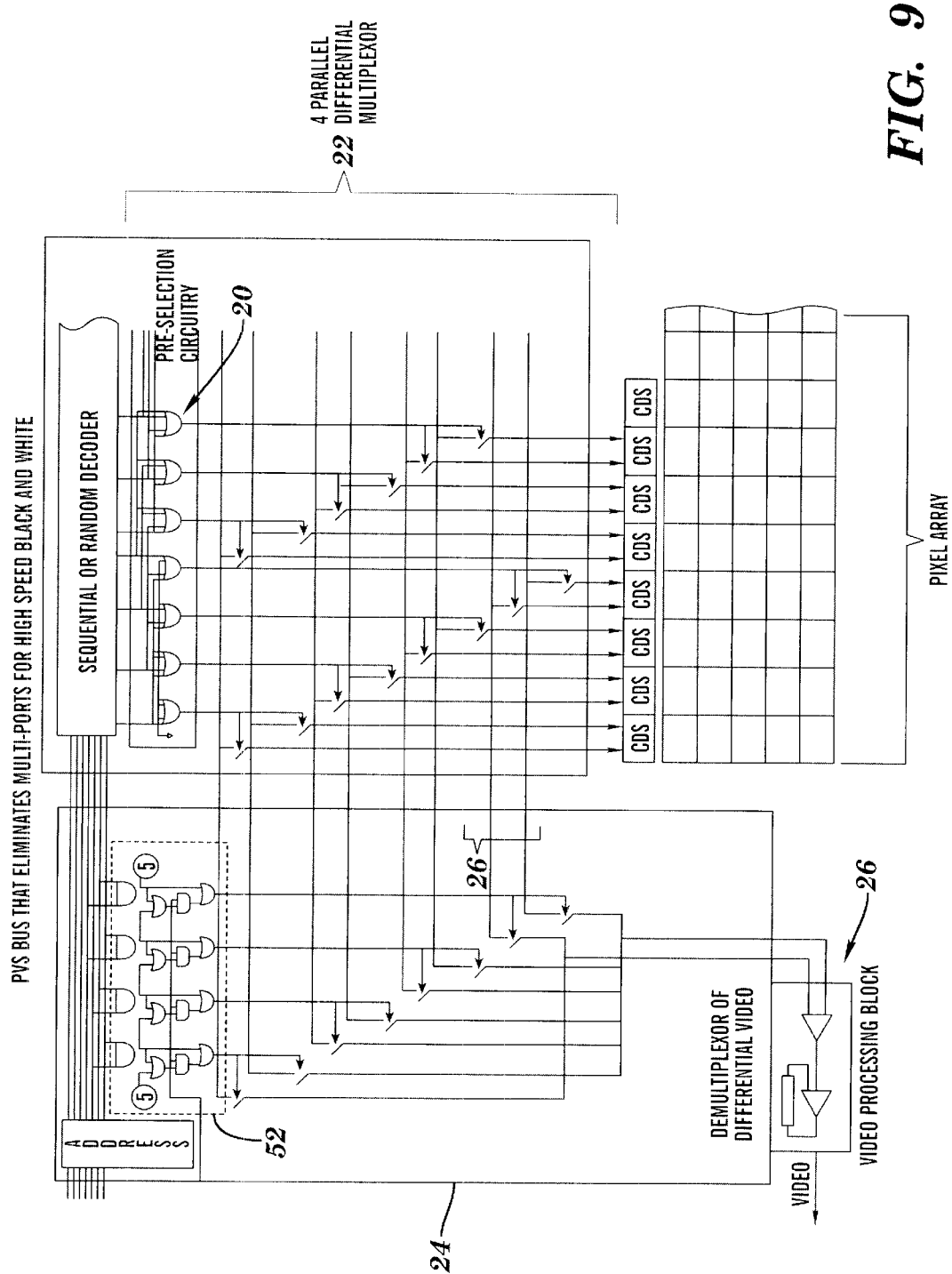
FIG. 9 is a view of a bus for pixel interpolation for increased resolution.

What has just been described in the previous two paragraphs can be done at a much higher rate with the bus in accordance with the present invention described herein. Utilizing the PVS Bus where the current pixel being read and the next three(or more) pixels are pre-selected and pre-charging the remaining video buses in parallel, the column(pixel) averaging is done by the demultiplexor. Where the demultiplexor of FIG. 7, circuit 24, is used to select adjacent pixels at the same time. FIG. 9 illustrates in circuit 52 how simple the added circuitry can be to allow column to column interpolation.

While the invention has been described in connection with a presently preferred embodiment thereof, many modifications and changes may be apparent to those skilled in the art without departing from the true spirit and scope of the invention, which is intended to be defined solely by the appended claims.

What is claimed is:

1. A bus system for transferring signals from a plurality of signal streams to an output, the bus system comprising:
   a plurality of signal buses in parallel, each of the plurality of signal buses is coupled to the output;
   a plurality of first switches, each of the plurality of first switches is coupled between one of the plurality of signal streams and one of the plurality of signal buses; and
   a control system coupled to each of the first plurality of switches, the control system controls when at least one of the first plurality of switches is closed to allow the signal from one of the plurality of signal streams coupled to the closed one of the first plurality of switches to substantially charge one of the plurality of signal buses which is also coupled to the closed one of the first plurality of switches and which is not currently being read at the output.

2. The bus system as set forth in claim 1 wherein the control system controls when at least another one of the first plurality of switches is closed to allow the signal from another one of the plurality of signal streams coupled to the closed another one of the first plurality of switches to be read at the output from another one of the plurality of signal buses which is also coupled to the closed another one of the first plurality of switches.

3. The bus system as set forth in claim 1 further comprising a plurality of second switches, each of the plurality of second switches is coupled between one of the plurality of signal buses and the output, the control system controls when each of the of the plurality of second switches is closed to allow the signal on one or more of the plurality of signal buses to be read at the output.

4. The bus system as set forth in claim 1 wherein the control system provides binning by coupling the signals from two or more of the plurality of signals buses to be read at the output at substantially the same time to average the signals together.

5. The bus system as set forth in claim 1 wherein a pair of the plurality of signal buses are coupled to each of the plurality of signal streams for differential processing.

6. The bus system as set forth in claim 1 wherein the control system further comprises:

a decoder; and a first control circuit coupled between the decoder and each of the first plurality of switches.

7. The bus system as set forth in claim 6 wherein the decoder is a sequential decoder.

8. The bus system as set forth in claim 6 wherein the decoder is a random decoder.

9. The bus system as set forth in claim 6 wherein the control system further comprises:

an address counter coupled to the decoder; and a second control circuit coupled between the address counter and each of the second plurality of switches.

10. A method for transferring signals from a plurality of signal streams to an output, the method comprising:

reading at least one of the signals at an output from at least one of a plurality of signal buses, each of the plurality of signal buses is coupled to the output;

allowing at least another one of the signals to substantially charge at least another one of the plurality of signal buses that is not being read at the output while the one of the signals is being read; and reading the at least another one of the signals at the output after the at least another one of the plurality of signal buses is substantially charged with the another one of the signals.

11. The method as set forth in claim 10 further comprising controlling when each of the plurality of signal buses is charged with one of the signals.

12. The method as set forth in claim 10 further comprising controlling when the reading at the output from each of the plurality of signal buses occurs.

13. The method as set forth in claim 10 wherein the reading at least one of the signals comprises binning the signals from two or more of the plurality of signals buses together to be read at the output at substantially the same time to average the signals together.

14. The method as set forth in claim 10 wherein the reading further comprises differential processing of the signals read from a pair of the plurality of signal buses, wherein each of the pair of the plurality of signal buses are coupled to one of the plurality of signal streams.

15. The method as set forth in claim 10 wherein the allowing at least another one of the signals to substantially charge at least another one of the plurality of signal buses comprises charging each of the plurality of signal buses with one of the signals in a sequential order.

16. The method as set forth in claim 10 wherein the allowing at least another one of the signals to substantially charge at least another one of the plurality of signal buses comprises charging each of the plurality of signal buses with one of the signals in a random order.

17. The method as set forth in claim 10 wherein the allowing at least another one of the signals to substantially charge at least another one of the plurality of signal buses comprises charging each of the plurality of signal buses with one of the signals at substantially the same time.

* * * * *

UNITED STATES PATENT AND TRADEMARK OFFICE
CERTIFICATE OF CORRECTION

PATENT NO.      : 6,590,198 B1
DATED           : July 8, 2003
INVENTOR(S)     : Jeffrey Zarnowski It is certified that error appears in the above-identified patent and that said Letters Patent is hereby corrected as shown below:

Column 3,
Line 15, after "FIG. 10 is a photograph of the invention" should be deleted.

Signed and Sealed this

Fourth Day of November, 2003

JAMES E. ROGAN
*Director of the United States Patent and Trademark Office*

US006590198C1

(12) INTER PARTES REEXAMINATION CERTIFICATE (482nd)
United States Patent
Zarnowski et al.

(10) Number: US 6,590,198 C1
(45) Certificate Issued: Oct. 29, 2012

(54) VIDEO BUS FOR HIGH SPEED MULTI-RESOLUTION IMAGERS

(75) Inventors: Jeffrey Zarnowski, McGraw, NY (US); Matthew Pace, Cortland, NY (US); Thomas Vogelsong, Jamesville, NY (US); Michael Joyner, North Syracuse, NY (US)

(73) Assignee: Panavision Imaging LLC

Reexamination Request:
No. 95/000,520, Nov. 24, 2009

Reexamination Certificate for:
Patent No.: 6,590,198
Issued: Jul. 8, 2003
Appl. No.: 09/490,374
Filed: Jan. 24, 2000

Certificate of Correction issued Nov. 4, 2003.

Related U.S. Application Data

(63) Continuation-in-part of application No. 09/039,835, filed on Mar. 16, 1998, now Pat. No. 6,084,229.

(51) Int. Cl.
*H04N 3/15* (2006.01)

(52) U.S. Cl. ......... 250/214 LS; 250/208.1; 348/E3.018; 348/E3.02; 348/E3.021; 348/E3.029

(58) Field of Classification Search .................. None
See application file for complete search history.

(56) References Cited

To view the complete listing of prior art documents cited during the proceeding for Reexamination Control Number 95/000,520, please refer to the USPTO's public Patent Application Information Retrieval (PAIR) system under the Display References tab.

*Primary Examiner* — Fred Ferris

(57) ABSTRACT

An analog video bus architecture that utilizes the column parallel nature of CMOS imagers and more specifically Active Column Sensors, that eliminates the need for multi-port imagers, by increasing the useable bandwidth of single port imagers. An adaptation of this invention allows for either binning or interpolation of pixel information for increased or decreased resolution along the columns and more specifically for ACS imagers binning or interpolation along the rows. In this bus, the single video bus is replaced by multiple video buses and instead of selecting only one column for reading multiple columns are also pre-selected in-order to pre-charge the video bus. The video buses are then de-multiplexed back on to one port at the desired element rate. This architecture utilizes the column oriented video bus of CMOS imagers. It divides the large video bus capacitance by the number of video buses used. In addition, it allows multiple pixel time constants to precharge the video bus. The best commercially available imager designs now claim 40 MHz per analog port and suffer from reduced signal to noise ratios. To overcome this fundamental bandwidth limitation, imager designs in the past have had to increase the number of video ports per imager to achieve high frame rates. Multiple ports per imager breaks the focal plane into segments that are typically reassembled via post processing in a host computer. The other problem with multiple ports is each segment of the imager will have its own offsets and resultant Fixed Pattern Noise (FPN). PVS-Bus™ eliminates the objectionable segmentation and simplifies high-speed system design. Also, by utilizing the column parallel nature of CMOS video buses a method and improved method of using the PVS-Bus of binning and interpolation is described which results in increased frame rate, and for decreased or increased resolution.

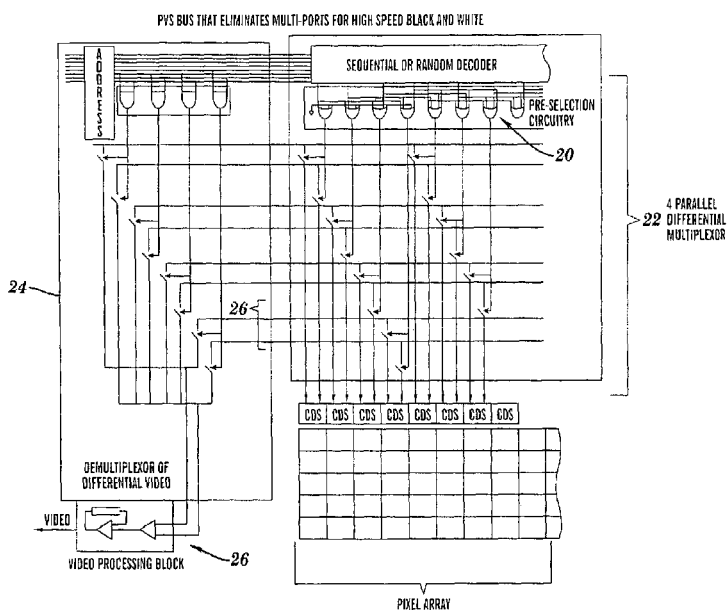

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1, 3, 10, 11 are cancelled.
Claims 2, 4-9 and 12-17 were not reexamined.

* * * * *